No. 871,244. PATENTED NOV. 19, 1907.
W. R. SMITH & M. A. PHELPS.
SPRING CUSHION WORK.
APPLICATION FILED NOV. 9, 1906.
2 SHEETS—SHEET 1.
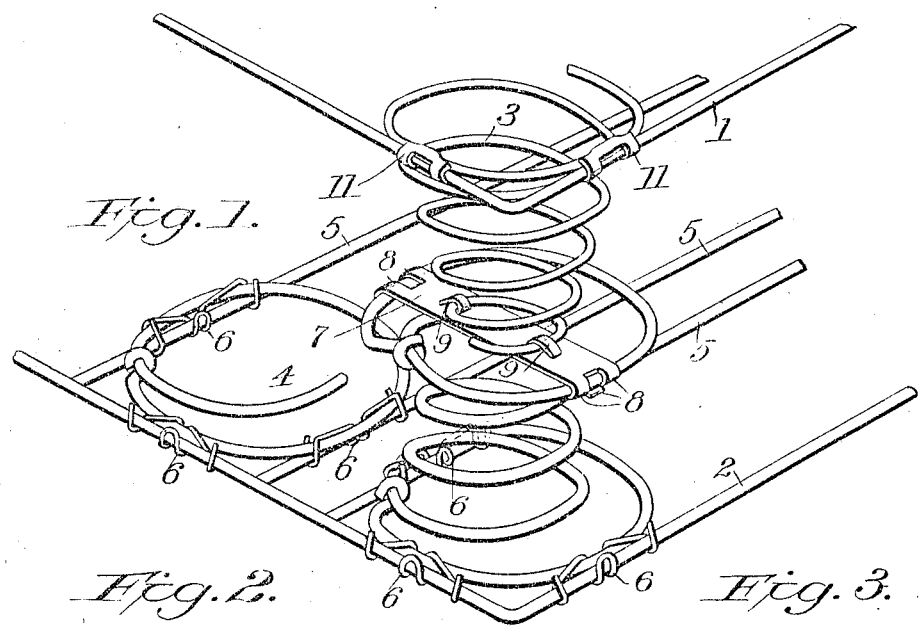
Fig. 1.
Fig. 2.
Fig. 3.
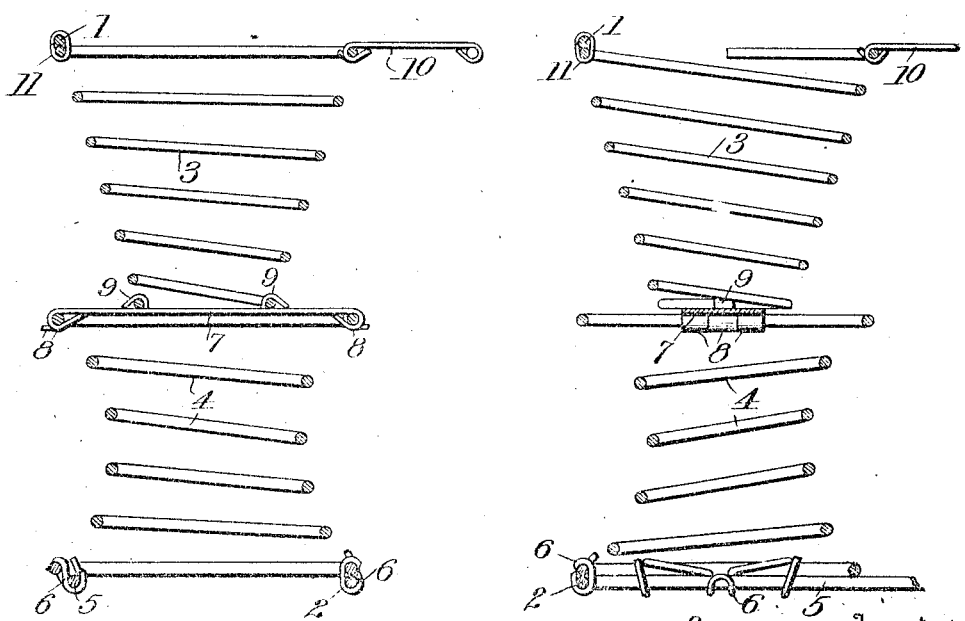
Fig. 4.
Witnesses
C. H. Walker
M. R. Meacham
Inventors
Watson R. Smith
Macy A. Phelps
By Shoemaker & Brown
Attorneys No. 871,244. PATENTED NOV. 19, 1907.
W. R. SMITH & M. A. PHELPS.
SPRING CUSHION WORK.
APPLICATION FILED NOV. 9, 1906.
2 SHEETS—SHEET 2.
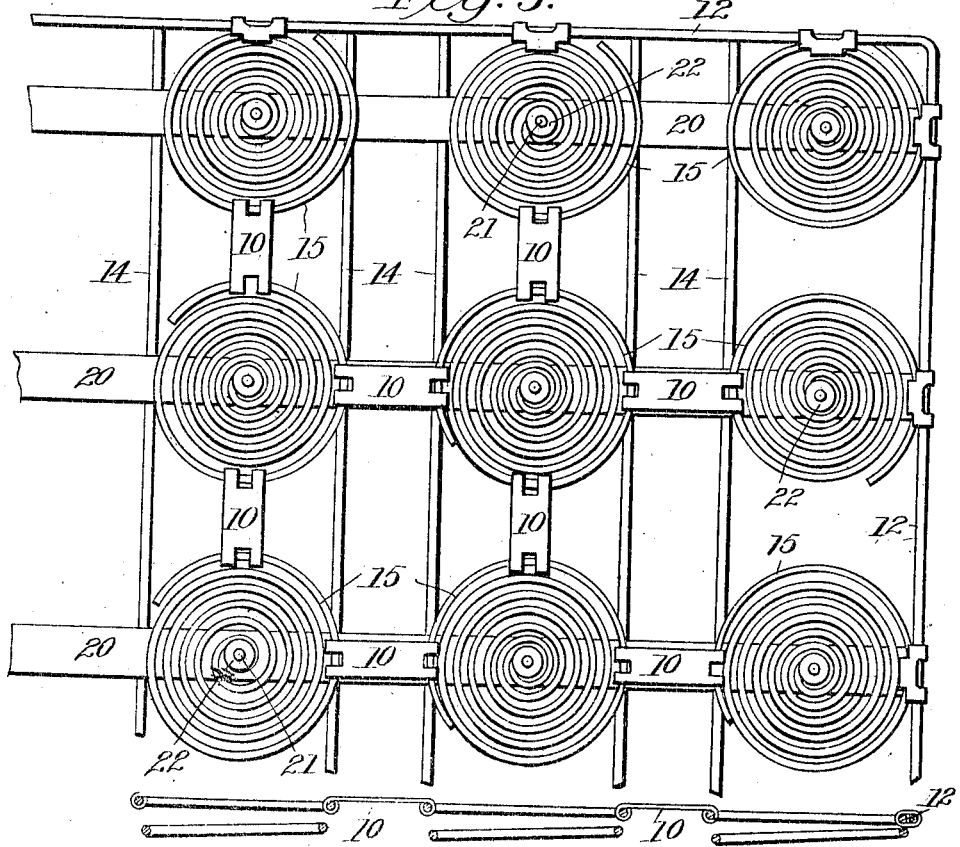
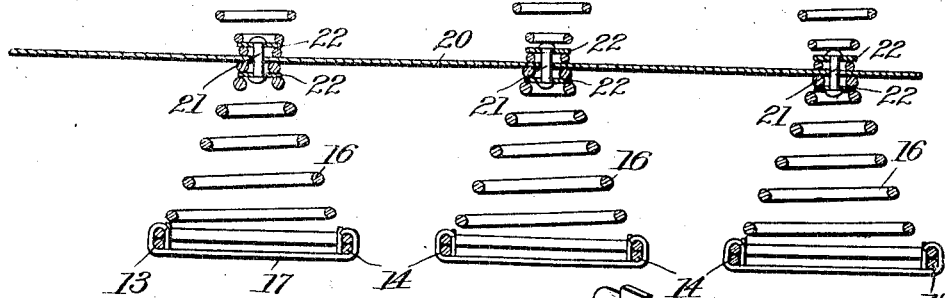
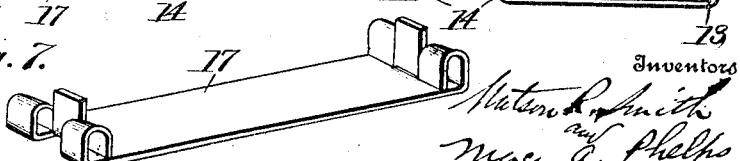

UNITED STATES PATENT OFFICE.

WATSON R. SMITH AND MACY A. PHELPS, OF JACKSON, MICHIGAN, ASSIGNORS TO JACKSON CUSHION SPRING COMPANY, OF JACKSON, MICHIGAN.

SPRING-CUSHION WORK.

No. 871,244.  Specification of Letters Patent.  Patented Nov. 19, 1907.

Application filed November 9, 1906. Serial No. 342,695.

*To all whom it may concern:*

Be it known that we, WATSON R. SMITH and MACY A. PHELPS, citizens of the United States, residing at Jackson, in the county of Jackson and State of Michigan, have invented certain new and useful Improvements in Spring-Cushion Work, of which the following is a specification.

This invention relates to spring cushion work.

One object of the invention resides in assembling one set of springs upon the top of another set of springs and connecting the upper and lower sets together.

Another object of the invention is to provide upper and lower sets of springs connected together with one set of springs formed of heavier material than the other set of springs.

In the formation of spring cushions they are sometimes made of a very light gage of wire so that they might be rendered soft, easy or resilient upon a vehicle going over an obstruction in the roadway and if these springs are made of a very light gage of wire, they will move toward each other when an obstruction is engaged and allow the springs of the cushions to strike the bottom of the seat; whereas, if the wire springs are made of a heavier gage of wire they are rendered stiff enough to prevent striking the bottom of the seat when the vehicle contacts with an obstruction, but the stiff springs preclude the possibility of proper resiliency. It is therefore another object of our invention to dispose a set of springs of a comparatively light gage of material upon another set of springs of a comparatively heavy gage of material, so that when an obstruction is engaged by the vehicle, the cushion will be found pliable and easy to ride and prevent the possibility of the rider striking the bottom of the seat on which he may be sitting, or in the case of a sleeping car, the bed upon which one may be lying. In our construction, when the cushion is used in a vehicle, the rider of the cushion, in the event of the vehicle striking an obstruction, will not strike the bottom of the seat for the springs of heavier gage material will cushion the springs of lighter gage of material.

While we refer specifically to vehicles in the expression of the objects of our invention, it is to be understood that our invention is equally applicable to chairs, stools, couches, beds and the like and that it is our intention to apply our invention in these connections as well as to use in vehicles.

With the above and other objects in view the present invention consists in the combination and arrangement of parts hereinafter specifically referred to, shown in the accompanying drawings and particularly pointed out in the appended claims, it being understood that changes may be made in the form, proportion, and size and minor details without departing from the spirit or sacrificing any of the advantages of the invention.

In the drawings:—Figure 1 is a perspective view of a corner of one form of the invention. Fig. 2 is a longitudinal sectional view. Fig. 3 is a transverse sectional view. Fig. 4 is a detail perspective view of one of the clips arranged between upper and lower sets of springs. Fig. 5 is a top plan view of another form of the invention. Fig. 6 is a longitudinal sectional view; and Fig. 7 is a detail view of one of the clips supporting the lower set of springs.

Referring now to the accompanying drawings, and more particularly to Figs. 1 to 4 inclusive, the reference characters 1 and 2 indicate upper and lower edge wires, while the characters 3 and 4 respectively indicate separate upper and lower sets of conical springs. The lower set of springs are composed of much heavier wire than the upper set of springs, as clearly shown in the drawings, so that the lower set may cushion the upper set upon pressure being brought to bear upon the cushion. The lower set of springs is supported upon pairs of supporting wires 5, and if desired, the outermost springs of the lower set may engage the lower edge wire. In any event the lower convolutions of the lower set of springs are rigidly secured to their supporting wires by means of the clips 6. It is obvious that the supporting wires may or may not be connected to the lower edge wire and it is also obvious that the lower edge wire may be in the form of a wooden frame.

Between the alining upper and lower sets of springs we arrange double end clips 7 provided with fingers 8 adapted to engage the corresponding sides of the upper convolutions of the corresponding springs 4. It will be seen that each clip 7 has three fingers at each end, the outermost fingers being bent in one direction and the intermediate finger being bent in the opposite direction to form the necessary rigid connection of the clip 7 with respect to the lower set of springs. Each clip 7 has a pair of oppositely disposed tongues 9 struck up therefrom and these tongues are designed to engage over the lower convolutions of the corresponding springs 3 to firmly support the upper set of springs at their bottom. It will thus be seen that the upper set of springs have a broad bearing surface and that they are rigidly connected to their bearing surface. These upper sets of springs are connected together by suitable clips 10 and the outermost springs of the upper set may be secured to the upper edge wire by means of clip 11.

In the construction described above, it will be seen that the lower sets of springs are of the double conical variety while the upper set of springs are of the cone variety with their apices arranged within the contour of the upper convolutions of the lower springs and resting firmly upon the aforesaid double end clip 7. However, it is obvious that we might employ both sets of springs of the double cone variety or both sets of the single cone variety with their apices directed toward each other.

In Figs. 5 to 7 we show a modified form of the invention, the characters 12 and 13 representing upper and lower edge wires and the numerals 14 representing supporting wires. In this form of the invention the upper and lower sets of springs 15 and 16 are of single conical variety with their apices directed toward each other, the lower convolutions of the lower set of the springs being connected to the supporting and lower edge wires by means of double end clips 17, which latter are of the same formation as the aforesaid double end clips 7, save that the clips 17 have not the tongues 9 of the clips 7 and the fact that the intermediate tongues 18 of the clips 17 are arranged preferably in substantially a vertical plane, while the outer fingers 19 are bent over the corresponding wires and the lower convolutions of the springs.

Between the corresponding rows of springs 15 and 16 we dispose suitable bands or strips 20, each provided with elements 21 projecting above and below the same and having a collar 22 at each end. The apex or smaller ends of the upper and lower alining rows of springs are connected to these elements 21 and arranged between the collars of the latter and the corresponding face of the bands or strips 20, as shown. As in the form first described, the upper set of springs are of lighter material than the lower set thereof, and the upper set of springs have their upper convolutions connected together by suitable clips 23 with the outermost rows of springs connected to the upper edge wire in any suitable manner.

There may be times when it will be desirable to have the springs of light gage of material upon the bottom and obviously our improved cushion could be reversed without departing from the spirit of the invention, the lower set of springs in any event cushioning the upper set of springs upon pressure being brought to bear upon the cushion.

As shown in the accompanying drawings, the springs of the lower set are of the same height as the upper set of springs, but one set may be shorter than the other set, if desired, the main object being to provide one set of springs of heavier gage than the other set.

What is claimed is:—

1. A spring cushion comprising a frame, supporting wires, a set of springs mounted upon the supporting wires, means for connecting the said springs to the supporting wires, another set of springs arranged upon the aforesaid set of springs, and clips each having inner and outer fingers at each end to connect opposite sides of the upper convolutions of the first named set of springs and each also provided with tongues intermediate its ends to connect the lower convolutions of the second set of springs to connect the two sets together.

2. A spring cushion comprising a frame, a set of lower spring members of relatively large wire mounted upon said frame, plates having loops bent from their ends for inclosing the upper convolutions of said spring members from one side and with loops in the ends whereby tongues are released for inclosing the said convolutions from the opposite sides and with clips intermediate the ends of the plate whereby oppositely extending tongues are produced, and a set of upper spring members of relatively small wire with the lower convolutions thereof engaging the intermediate tongues of said plate.

3. A spring cushion comprising a support, a lower spring member of relatively heavy wire connected at one end to said support, a plate bearing over the upper convolution of said lower spring member and with loops at the ends engaging said upper convolutions and with oppositely extending tongues intermediate the ends of said plate, and an upper spring member of relatively small wire and engaging said intermediate tongues by its lower convolution.

4. A spring cushion comprising a support, a lower spring member connected at one end to said support, a plate bearing over the upper convolution of said lower spring member and with loops at the ends engaging said upper convolution and with oppositely extending tongues intermediate the ends of said plate, and an upper spring member engaging said intermediate tongues by its lower convolution.

In testimony whereof we have signed our names to this specification in the presence of two subscribing witnesses.

WATSON R. SMITH.
    MACY A. PHELPS.

Witnesses:
 MABEL ALLINGSON,
 ETHEL M. PHELAN.